US009047675B2

(12) United States Patent
Tillotson

(10) Patent No.: US 9,047,675 B2
(45) Date of Patent: Jun. 2, 2015

(54) STRIKE DETECTION USING VIDEO IMAGES

(75) Inventor: Brian J. Tillotson, Kent, WA (US)

(73) Assignee: THE BOEING COMPANY, Chicago, IL (US)

(*) Notice: Subject to any disclaimer, the term of this patent is extended or adjusted under 35 U.S.C. 154(b) by 378 days.

(21) Appl. No.: 13/584,559

(22) Filed: Aug. 13, 2012

(65) Prior Publication Data

US 2014/0043481 A1 Feb. 13, 2014

(51) Int. Cl.
*H04N 7/18* (2006.01)
*G06T 7/20* (2006.01)
(52) U.S. Cl.
CPC .......... *G06T 7/20* (2013.01); *G06T 2207/30261* (2013.01)
(58) Field of Classification Search
USPC .......... 348/143, 144, 148, 152, 155; 340/435, 340/436, 425.5; 701/14, 49, 495
IPC ........................................................ H04N 7/18
See application file for complete search history.

(56) References Cited

U.S. PATENT DOCUMENTS

| 7,741,961 | B1 | 6/2010 | Rafii et al. |
| 7,932,838 | B2 * | 4/2011 | Hamza et al. ................. 340/958 |
| 8,102,423 | B2 * | 1/2012 | Cheng ........................... 348/143 |
| 2010/0289632 | A1 | 11/2010 | Seder et al. |
| 2011/0013016 | A1 | 1/2011 | Tillotson |
| 2011/0125349 | A1 | 5/2011 | Ace |
| 2011/0133917 | A1 | 6/2011 | Zeng |

FOREIGN PATENT DOCUMENTS

| EP | 2037408 A1 | 3/2009 |
| WO | WO2012005377 A1 | 1/2012 |

OTHER PUBLICATIONS

Latecoere, "Landscape Camera System," http://www.seb-studio.fr/_projets_/latecoere/spip.php?rubrique12, copyright 2012, accessed Aug. 14, 2012, 1 page.
Securaplane Technologies, Inc., "Camera systems," http://securaplane.com/products/camera-systems, copyright 2012, accessed Aug. 14, 2012, 2 pages.
Esterline CMC Electronics, "See More with SureSight Integrated Sensor Systems for Enhanced Flight Vision System Applications," http://www.esterline.com/Portals/17/Documents/en-us/SureSight_4pager.pdf, Jul. 2012, accessed Aug. 14, 2012, 4 pages.
International Search Report and Written Opinion dated Feb. 7, 2014, regarding Application No. PCT/US2013/036007, 13 pages.
Gandhi et al, "Detection of Obstacles in the Flight Path of an Aircraft," Proceedings 2000 IEEE Conference on Computer Vision and Pattern Recognition, Jun. 13, 2000, pp. 304-311.
International Preliminary Report on Patentability, dated Feb. 17, 2015, regarding Application No. PCT/US2013/06007, 8 pages.

* cited by examiner

*Primary Examiner* — Sherrie Hsia
(74) *Attorney, Agent, or Firm* — Yee & Associates, P.C.

(57) ABSTRACT

A method and apparatus for strike detection. Images of an object are identified in video images from a video camera on a vehicle. A movement of the object with respect to the vehicle is identified from the images of the object in the video images. It is determine whether the movement of the object with respect to the vehicle indicates that the object will strike the vehicle. A strike report comprising information indicating that the object will strike the vehicle is generated in response to a determination that the object will strike the vehicle.

20 Claims, 7 Drawing Sheets

STRIKE DETECTION USING VIDEO IMAGES

BACKGROUND INFORMATION

1. Field

The present disclosure relates generally to systems and methods for analyzing images to identify an object that may strike a vehicle. More particularly, the present disclosure relates to analyzing images from a camera on an aircraft to identify a bird strike on the aircraft.

2. Background

Modern commercial and other aircraft are designed to withstand bird strikes without affecting the safe operation of the aircraft. Furthermore, such aircraft may have instruments for detecting and reporting inconsistencies at any location on the aircraft that could possibly affect the safety of flight. Potential inconsistencies that may be caused by bird strikes, but that may not be detected by such instruments, may be limited to effects on the appearance or aerodynamic performance of the aircraft. Therefore, bird strikes are generally not a safety issue for such aircraft.

Although a bird strike may not affect aircraft safety, aircraft operator or regulatory rules, based on an abundance of caution, may call for diversion or turn back if a bird strike on the aircraft is suspected to have occurred. As a result, bird strikes, and suspected bird strikes, may be the cause of significant costs for airlines and other aircraft operators.

Bird strikes may be a safety issue for non-commercial or other manned aircraft and for unmanned air vehicles. For example, unmanned air vehicles and other relatively small aircraft may have less capacity to carry the systems and structures that make larger commercial aircraft robust against bird strikes.

Bird strikes may be a significant issue for some manned and unmanned military or other aircraft with stealth capabilities. A bird strike on such an aircraft may cause inconsistencies in the coatings or other features that make the aircraft stealthy.

Accordingly, it would be beneficial to have a method and apparatus that takes into account one or more of the issues discussed above as well as possibly other issues.

SUMMARY

An illustrative embodiment of the present disclosure provides a method for strike detection. Images of an object are identified in video images from a video camera on a vehicle. A movement of the object with respect to the vehicle is identified from the images of the object in the video images. It is determined whether the movement of the object with respect to the vehicle indicates that the object will strike the vehicle. A strike report comprising information indicating that the object will strike the vehicle is generated in response to a determination that the object will strike the vehicle.

Another illustrative embodiment of the present disclosure provides an apparatus comprising a video image data receiver, an image data processor, a strike detector, and a strike report generator. The video image data receiver is configured to receive video image data for video images from a video camera on a vehicle. The image data processor is configured to process the video image data to identify images of an object in the video images and to identify a movement of the object with respect to the vehicle from the images of the object in the video images. The strike detector is configured to determine whether the movement of the object with respect to the vehicle indicates that the object will strike the vehicle. The strike report generator is configured to generate a strike report comprising information indicating that the object will strike the vehicle in response to a determination that the object will strike the vehicle.

Another illustrative embodiment of the present disclosure provides an apparatus comprising a camera system on an aircraft configured to provide video images and a strike detection system on the aircraft. The strike detection system is configured to receive video image data for the video images from the camera system, process the video image data to identify images of a bird in the video images and to identify a movement of the bird with respect to the aircraft from the images of the bird in the video images, determine whether the movement of the bird with respect to the aircraft indicates that the object will strike the aircraft, and generate a strike report comprising information indicating that the bird will strike the aircraft in response to a determination that the bird will strike the aircraft.

The features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of illustrative embodiments of the present disclosure when read in conjunction with the accompanying drawings, wherein:

DETAILED DESCRIPTION

Figure 1:
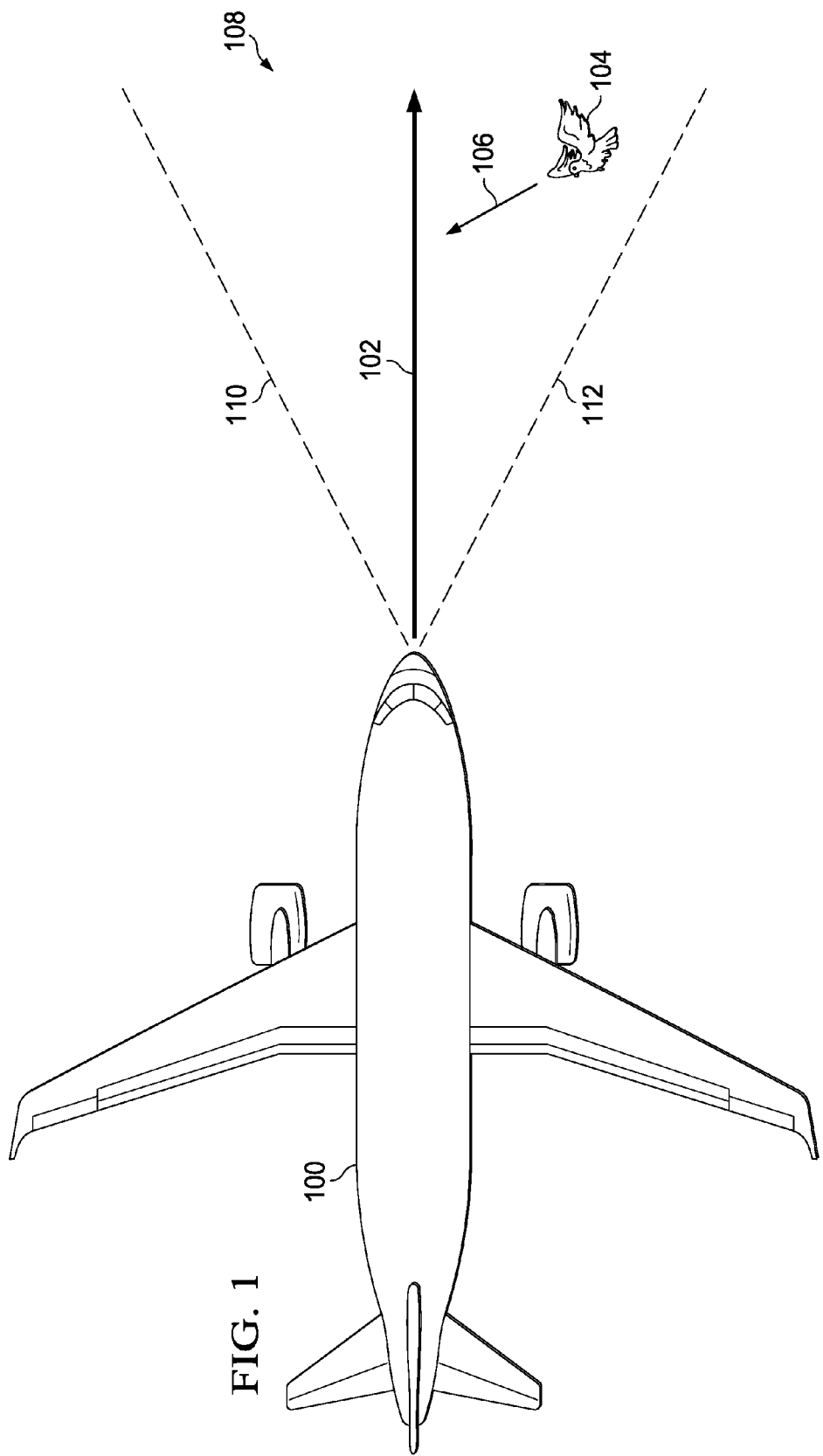
FIG. 1 is an illustration of an aircraft and a bird in flight in accordance with an illustrative embodiment.

The different illustrative embodiments recognize and take into account a number of different considerations. "A number", as used herein with reference to items, means one or more items. For example, "a number of different considerations" means one or more different considerations.

The different illustrative embodiments recognize and take into account that a large portion of the costs incurred by airlines due to bird strikes is for strikes or suspected strikes that do not result in any inconsistencies to the aircraft. Even though the aircraft is not affected by such bird strikes, or suspected strikes, costs may still be incurred due to diversions, turn backs, or enhanced inspection. These costs may be incurred because the flight crew on an aircraft currently may be able to deduce little more than that a bird strike may have just happened.

Currently, an aircraft flight crew may lack any means for determining accurately whether a bird struck the aircraft, where on the aircraft it struck, how large the bird was, or any other characteristics of the bird strike or suspected strike. The different illustrative embodiments recognize and take into account that a pilot or other member of the flight crew may identify a bird strike, identify where the bird struck the aircraft, and estimate the size of the bird based on visual observation from the cockpit window. However, the flight crew may not be able to see where the bird struck the aircraft unless it hits the windshield or front of the aircraft fuselage.

In some cases the flight crew on an aircraft may be able to identify a possible bird strike from instrument readings. The readings from various instruments that are used to monitor various operational conditions of the aircraft may be affected by a bird strike on the aircraft. However, these instruments are not designed to detect bird strikes and may not be relied upon for detecting bird strikes in an accurate and consistent manner.

The different illustrative embodiments recognize and take into account that the costs associated with a bird strike on an aircraft may be reduced or avoided if the flight crew could identify the characteristics of a bird strike more accurately. For example, without limitation, if the crew knew that a sufficiently small bird struck a sufficiently strong part of the aircraft, costly diversions or increased inspections at the next destination might be avoided.

The different illustrative embodiments also recognize and take into account that, using visual observation supplemented by instrument readings, flight crews on an aircraft currently may not notice all bird strikes on the aircraft. Currently, even some bird strikes that may cause inconsistencies in the aircraft may not be noticed by the flight crew during a flight.

The different illustrative embodiments recognize and take into account that bird strikes on an aircraft may be identified by post flight inspection of an aircraft. For example, mechanics or other personnel inspecting an aircraft on the ground after a flight may find blood, dents, or other inconsistencies indicating that a bird strike may have occurred. However, if the flight crew on an aircraft does not notice a bird strike during a flight, and the aircraft has flown through rain or other weather that cleans up the blood or other evidence of the bird strike, then the bird strike may not be identified by post flight inspection.

The different illustrative embodiments also recognize and take into account that a pilot or a remote operator of a military aircraft with stealth capability may not notice a bird strike on the aircraft. Such a strike may affect the stealth capability of the aircraft in an undesired way. If the aircraft is flown into a hostile environment after such a bird strike that goes unnoticed, it may be more likely that the aircraft is detected by enemy radar or other sensors. Such detection may jeopardize the mission of the aircraft and, in some cases, may lead to loss of the aircraft. A system or method to alert the pilot or operator of a possible bird strike on the aircraft is desirable to avoid this outcome.

Illustrative embodiments provide a system and method for determining whether a bird strike on an aircraft has occurred or is likely to occur and for identifying various characteristics of a bird strike on an aircraft. Illustrative embodiments include a system and method for using video images from a camera system on an aircraft to identify a bird approaching the aircraft in flight. The movement of the bird with respect to the aircraft is identified using the video images to determine whether the bird is likely to strike or has struck the aircraft. The impact point of the bird on the aircraft, the size of the bird, or other characteristics of the bird strike may be identified. The characteristics of the bird strike on the aircraft may be reported to appropriate personnel so that appropriate action may be taken in response to the bird strike.

Turning now to FIG. 1, an illustration of an aircraft and a bird in flight is depicted in accordance with an illustrative embodiment. In this example, aircraft 100 may be moving in flight in the direction indicated by arrow 102. Bird 104 may be moving in flight in the direction indicated by arrow 106. Aircraft 100 and bird 104 are not necessarily shown to scale in FIG. 1. Depending on the positions and relative movements of aircraft 100 and bird 104, bird 104 may strike aircraft 100.

In accordance with an illustrative embodiment, video images from a camera system on aircraft 100 may be used to determine whether bird 104 is likely to strike, or has struck, aircraft 100. Further, the video images from the camera system may be used to identify various characteristics of the bird strike. For example, the camera system on aircraft 100 may include a number of video cameras with field of view 108. In this example, field of view 108 is defined by the area in front of aircraft 100 between lines 110 and 112 in the direction of movement of aircraft 100. Bird 104 is within field of view 108. Therefore, video images from the camera system on aircraft 100 will include images of bird 104.

In accordance with an illustrative embodiment, the video images from the camera system on aircraft 100 may be processed to identify the images of bird 104 in the video images. Movement of the images of bird 104 in the video images over time may be used to identify the movement of bird 104 with respect to aircraft 100. The movement of bird 104 with respect to aircraft 100 may be used to determine whether bird 104 has struck or is likely to strike aircraft 100. The images of bird 104 in the video images also may be used to determine other characteristics of a bird strike. For example, without limitation, the images of bird 104 in the video images may be used to determine the location on aircraft 100 that is struck by bird 104 and the size of bird 104.

Figure 2:
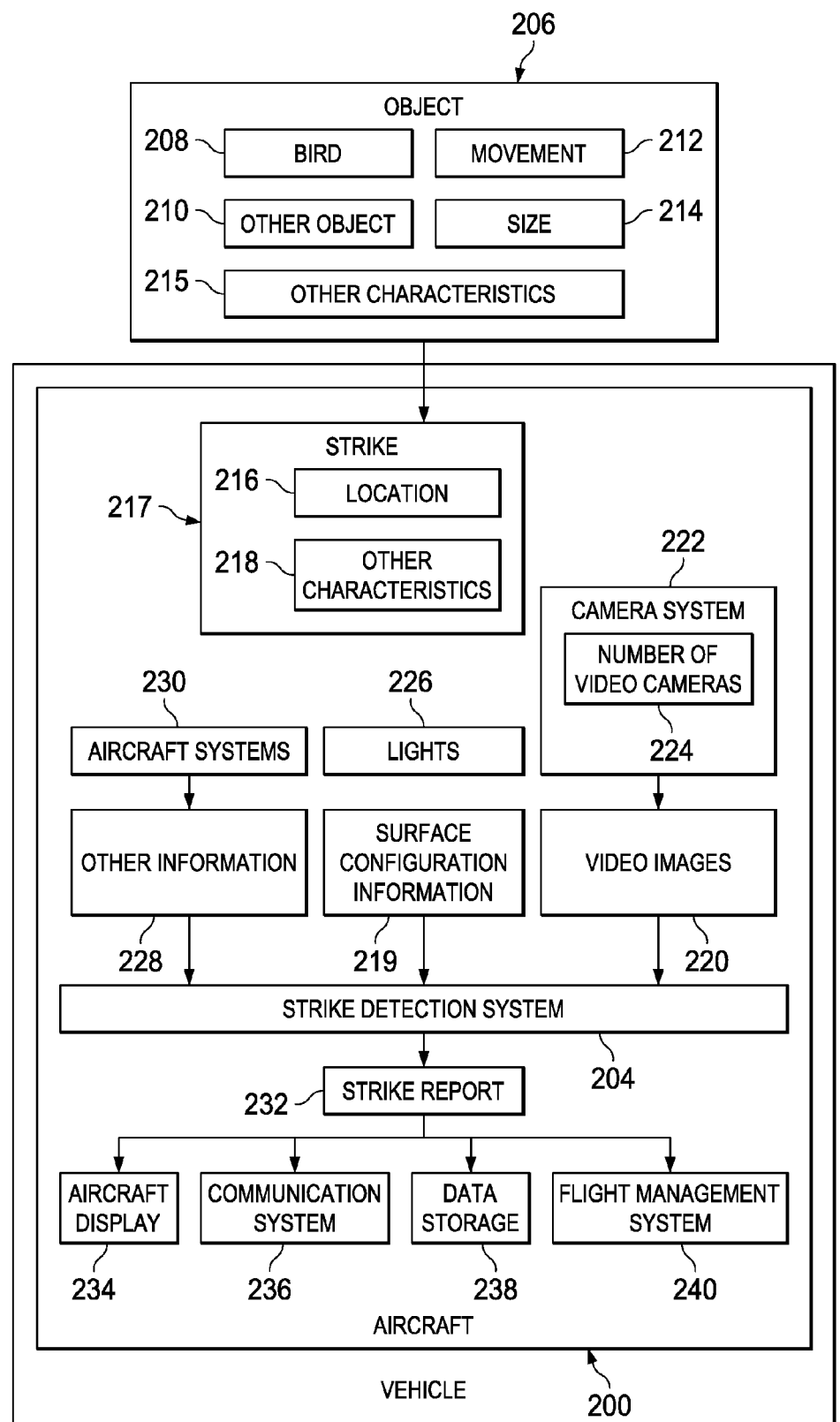
FIG. 2 is an illustration of a block diagram of an aircraft with strike detection using video images in accordance with an illustrative embodiment.

Turing now to FIG. 2, an illustration of a block diagram of an aircraft with strike detection using video images is depicted in accordance with an illustrative embodiment. In this example, aircraft 200 is an example of one implementation of aircraft 100 in FIG. 1.

Aircraft 200 may be any type of aircraft. For example, without limitation, aircraft 200 may be a fixed wing, rotary wing, or lighter than air aircraft. Aircraft 200 may be manned or unmanned. For example, without limitation, aircraft 200 may be an unmanned air vehicle. Aircraft 200 may be designed to perform any mission and may be operated by any operator of aircraft 200. For example, without limitation, aircraft 200 may be a commercial passenger aircraft operated by an airline, a cargo aircraft operated by a private or public entity, a military aircraft operated by a military or other government organization, a personal aircraft operated by an individual, or any other type of aircraft operated by any other aircraft operator.

Aircraft 200 is an example of vehicle 202 in which illustrative embodiments may be implemented. Vehicle 202 may be any moving platform that is configured to travel through or on any medium. For example, without limitation, vehicle 202 may be an aerospace vehicle that is configured to travel through the air and in space, a land vehicle configured to travel over land, or any other vehicle configured to travel through or on any other medium or combinations of media. For example, without limitation, vehicle 202 may be a high speed train configured to travel on rails over the land.

In this application, including in the claims, the terms "strike" and "struck" and any similar or related terms refers to the collision of a first object and a second object without regard to whether both objects are moving or only one of the objects is moving and, in the latter case, without regard to which of the objects is moving and which of the objects is not moving. For example, in the present application, the phrase "object striking an aircraft" refers equally to a moving object colliding with a moving aircraft, a moving aircraft colliding with a non-moving object, and a moving object colliding with a non-moving aircraft.

Aircraft 200 may include strike detection system 204. Strike detection system 204 may be configured to determine whether object 206 has struck or is likely to strike aircraft 200. Strike detection system 204 also may be configured to identify various characteristics of such a strike.

Strike detection system 204 may be implemented in software running on a data processing system, in hardware, or in a combination of software and hardware. For example, without limitation, strike detection system 204 may be implemented, in whole or in part, on a dedicated data processing system on aircraft 200 or on a data processing system that is used for other purposes on aircraft 200. Some or all of the functionality of strike detection system 204 may be implemented off board aircraft 200.

Object 206 may be any object that may strike aircraft 200. For example, object 206 may be bird 208 or other object 210. Object 206 may be in the air or on the ground. For example, without limitation, other object 210 may be another aircraft, a missile, or any other airborne man-made or natural object. As another example, without limitation, other object 210 may be a deer or other animal or any other natural or man-made object on a runway on which aircraft 200 is landing.

Object 206 may have movement 212, size 214, other characteristics 215 or various combinations of such characteristics. Movement 212 may refer to the movement of object 206 with respect to aircraft 200. For example, without limitation, movement 212 may be characterized by a direction of movement of object 206 with respect to aircraft 200, a speed of movement of object 206 with respect to aircraft 200, or both. Movement 212 also may be referred to as the trajectory of object 206 with respect to aircraft 200.

Strike detection system 204 may be configured to identify movement 212, size 214 or other characteristics 215 of object 206, or various combinations of such characteristics. For example, without limitation, strike detection system 204 may be configured to use movement 212, or movement 212 in combination with size 214, to determine whether object 206 has struck or is likely to strike aircraft 200. Strike detection system 204 also may be configured to use movement 212, or movement 212 in combination with size 214, to identify location 216 of strike 217. Furthermore, strike detection system 204 also may be configured to use movement 212, size 214, other characteristics 215, or various combinations of such characteristics to identify other characteristics 218 of strike 217.

Location 216 of strike 217 may be a location on aircraft 200 that is struck by object 206. For example, location 216 of strike 217 may be a location on the surface of aircraft 200 that is struck by object 206.

Other characteristics 218 of strike 217 may include characteristics indicating a level of severity or concern that may be associated with strike 217. For example, without limitation, other characteristics 218 of strike 217 may include an indication of whether or not strike 217 is likely to cause inconsistencies in aircraft 200. Other characteristics 218 of strike 217 also may include an indication of the likely severity of any inconsistency in aircraft 200 that might be caused by strike 217.

Other characteristics 218 of strike 217 may depend on location 216 of strike 217. For example, without limitation, the likelihood and severity of any inconsistencies in aircraft 200 that may be caused by strike 217 may be less if location 216 of strike 217 corresponds to a stronger location on aircraft 200 that may be more resistant to strike 217.

Strike detection system 204 may be configured to determine whether object 206 has struck aircraft 200, or is likely to strike aircraft 200, and to identify strike location 216, using movement 212, or movement 212 in combination with size 214, in combination with surface configuration information 219. Surface configuration information 219 may include information describing the configuration of various surfaces of aircraft 200 that may be struck by object 206. For example, without limitation, surface configuration information 219 may include information describing the configuration of the surfaces on the front of aircraft 200. In any case, surface configuration information 219 may include any information describing the size and shape of aircraft 200 or of any portion of aircraft.

In accordance with an illustrative embodiment, strike detection system 204 is configured to determine whether object 206 has struck or is likely to strike aircraft 200, and various characteristics of strike 217, using video images 220 from camera system 222 on aircraft 200. For example, without limitation, video images 220 may include a series of images of the scene in front of aircraft 200, in the direction in which aircraft 200 is moving. Camera system 222 may include number of video cameras 224. Number of video cameras 224 may be mounted in known or knowable positions and orientations on aircraft 200. Number of video cameras 224 may be mounted facing generally forward on aircraft 200, in the direction in which aircraft 200 is moving, to view bird 208 or other object 210 in the path of aircraft 200.

Aircraft 200 may include lights 226. For example, without limitation, lights 226 may include landing lights, lights associated with camera system 222, or other external lights on aircraft 200. Lights 226 may be turned on to illuminate bird 208 or other object 210 that may strike aircraft 200 to enhance the images of bird 208 or other object 210 in video images 220.

Strike detection system 204 may be configured to receive video images 220 from camera system 222. Strike detection system 204 may be configured to process video images 220 to identify images of object 206 in video images 220, to identify various characteristics of object 206, to determine whether object 206 has struck or is likely to strike aircraft 200, and to identify various characteristics of strike 217.

Strike detection system 204 may be configured to use information in addition to video images 220 to determine whether object 206 has struck or is likely to strike aircraft 200 and to identify various characteristics of strike 217. For example, without limitation, such additional information may include surface configuration information 219, other information 228, or both. For example, without limitation, other information 228 may include the current time, the current location of aircraft 200, the current velocity of aircraft 200, or other appropriate information or combinations of information that may be used by strike detection system 204 to determine whether object 206 has struck or is likely to strike aircraft 200 and to identify various characteristics of strike 217.

Other information 228 may be provided by aircraft systems 230. Strike detection system 204 may be configured to receive other information 228 from aircraft systems 230. Aircraft systems 230 may include various systems and devices on aircraft 200 that may be configured to provide other information 228. For example, without limitation, aircraft systems 230 may include a navigation system for aircraft 200, such as a satellite based positioning system unit, an inertial navigation system unit, or any other system or device on aircraft 200 for providing other information 228.

Strike detection system 204 may be configured to generate strike report 232. Strike report 232 may indicate that object 206 has struck or is likely to strike aircraft 200. Strike report 232 also may include information identifying various characteristics of strike 217. For example, without limitation, strike report 232 may include information identifying location 216 of strike 217, size 214, movement 212 or other characteristics 215 of object 206 striking aircraft 200, other characteristics 218 of strike 217, or various combinations of such characteristics.

Strike report 232 may be used for a variety of purposes. The particular format of strike report 232 and the particular information that may be included in strike report 232 may depend on how strike report 232 is to be used.

Strike report 232 may be displayed on aircraft display 234 to one or more members of the crew of aircraft 200. For example, without limitation, aircraft display 234 may include a display in the cockpit of aircraft 200 for displaying strike report 232 to the pilot and other members of the flight deck crew on aircraft 200. The crew of aircraft 200 may use the information in strike report 232 that is displayed on aircraft display 234 to make decisions regarding flight operations. For example, without limitation, the crew may use the information in strike report 232 to make decisions about whether to continue or divert a flight.

Strike report 232 may be provided to communication system 236 for transmission to a location off board aircraft 200. For example, without limitation, communication system 236 may include a radio or other system on aircraft 200 for transmitting strike report 232 from aircraft 200 to a location on the ground or to another location or any number of locations off board aircraft 200. For example, without limitation, communication system 236 may be used to transmit strike report 232 to a maintenance entity so that spare parts may be pre-positioned or other appropriate action taken. As another example, communication system 236 may be used to transmit strike report 232 to a remote operator controlling aircraft 200 in cases where aircraft 200 is an unmanned air vehicle.

Strike report 232 may be stored in data storage 238. For example, without limitation, data storage 238 may include any appropriate data storage device. Data storage 238 may be located on aircraft 200, at a location that is not on aircraft 200, or both. For example, without limitation, the information in strike report 232 may be retrieved from data storage 238 at any appropriate time by a member of the flight crew, maintenance personnel, or any other authorized user of the information in strike report 232.

Strike report 232 may be provided to flight management system 240. Flight management system may include a flight management computer or other system that may be used for managing the flight of aircraft 200. For example, without limitation, the information in strike report 232 may be used by flight management system 240 for controlling aircraft 200 to take evasive actions to avoid a predicted strike by bird 208 or other object 210 on aircraft 200.

Strike report 232 may be sent to various users or combinations of users that may be different from or in addition to the users of strike report 232 described as examples herein. The information in strike report 232 may be used by such users for various purposes and in various ways that may be different from or in addition to the uses of strike report 232 described as examples herein.

The illustration of FIG. 2 is not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

Figure 3:
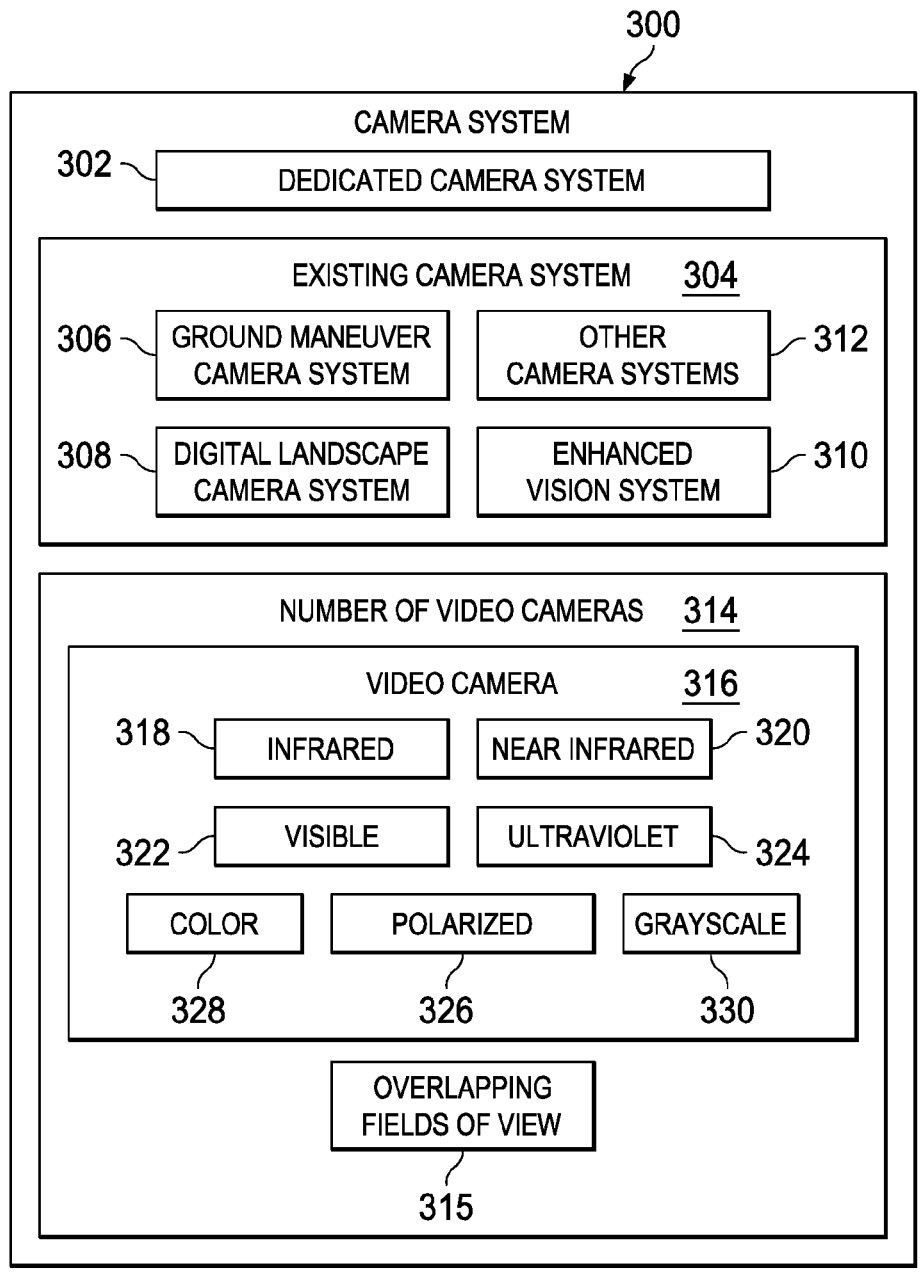
FIG. 3 is an illustration of a block diagram of a camera system in accordance with an illustrative embodiment.

Turning now to FIG. 3, an illustration of a block diagram of a camera system is depicted in accordance with an illustrative embodiment. In this example, camera system 300 is an example of one implementation of camera system 222 in FIG. 2.

Camera system 300 may be dedicated camera system 302 or existing camera system 304. Dedicated camera system 302 may be a camera system that is provided on an aircraft or other vehicle for the purpose of obtaining video images for strike detection. In this example, the video images obtained by dedicated camera system 302 may be used exclusively or primarily for strike detection. Existing camera system 304 may be a camera system that is provided on an aircraft or other vehicle for obtaining video images for a purpose other than strike detection. In this example, the video images obtained by existing camera system 304 may be used both for strike detection and for some other purpose. For example, without limitation, existing camera system 304 on a commercial passenger aircraft or other aircraft may include Ground Maneuver Camera System 306, Digital Landscape Camera System 308, Enhanced Vision System 310, other camera systems 312, or a combination of such systems.

Ground Maneuver Camera System 306 is a system used on large aircraft to view the nose and main landing gear of the aircraft during ground operations. This system provides pilots with information on the aircraft position relative to runway and taxiway edges so that the pilot may avoid driving the aircraft off of the pavement.

Digital Landscape Camera System 308 is used in flight for passenger entertainment. This system uses one or more cameras mounted on the aircraft with a forward or downward facing view.

Enhanced Vision System 310 is an infrared camera system on some aircraft. This system may be used to enhance situational awareness for pilots during approach, landing, taxi and takeoff during adverse weather conditions. This system may include an infrared camera mounted to the nose cone of the aircraft.

For example, without limitation, other camera systems 312 may include personal video cameras, video cameras on smart phones, or other appropriate camera systems for obtaining video images.

Camera system 300 includes number of video cameras 314. Number of video cameras 314 may include video cameras of the same type or a number of different types of video cameras.

Number of video cameras 314 may include multiple video cameras with overlapping fields of view 315. Overlapping fields of view 315 may allow for stereo tracking of objects in the video images provided by number of video cameras 314.

Number of video cameras 314 includes video camera 316. Video camera 316 may operate over any range or ranges of wavelengths to obtain video images. For example, without limitation, video camera 316 may be configured to obtain video images at infrared 318, near infrared 320, visible 322, ultraviolet 324, or other wavelengths or combinations of wavelengths. Video camera 316 may be configured to obtain video images from light that is polarized 326. For example, without limitation, a polarization filter may be provided on the lens of video camera 316. Video camera 316 may provide video images in color 328 or in grayscale 330.

Figure 4:
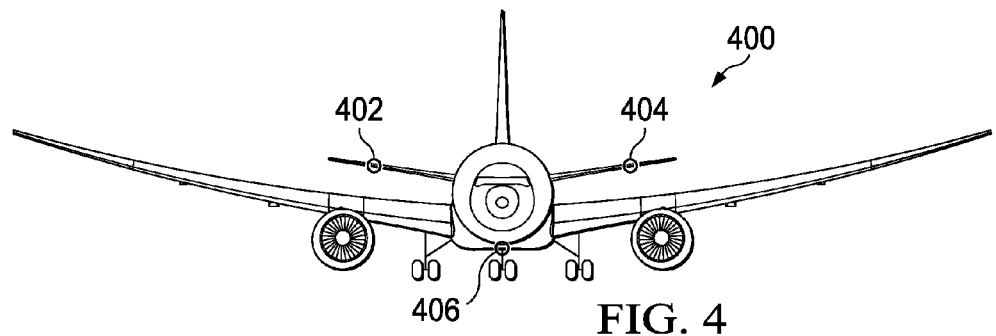
FIG. 4 is an illustration showing locations on an aircraft of video cameras in a camera system in accordance with an illustrative embodiment.

Turning now to FIG. 4, an illustration showing locations on an aircraft of video cameras in a camera system is depicted in accordance with an illustrative embodiment. In this example, aircraft 400 is an example of one implementation of aircraft 200 in FIG. 2.

In this example, a camera system that may be used to obtain video images for strike detection may include three video cameras mounted on aircraft 400. Two of the video cameras may be mounted on the leading edge of the horizontal stabilizers on aircraft 400, at locations 402 and 404. The third video camera may be mounted under the nose of aircraft 400, at location 406. For example, without limitation, locations 402, 404, and 406 on aircraft 400 may be the locations of video cameras that are part of a Ground Maneuver Camera System 306 or other camera systems 312 in FIG. 3 on aircraft 400. Strike detection in accordance with an illustrative embodiment may use video images provided by other camera systems, including camera systems with video cameras mounted at locations on aircraft 400 other than locations 402, 404, and 406.

The vertical field of view of a video camera mounted on aircraft 400 may vary with the angle of attack of aircraft 400. The field of view of a video camera will also vary if the camera is mounted on a movable surface on aircraft 400. For example, the field of view of video cameras mounted at locations 402 and 404 on aircraft 400, on the movable horizontal stabilizers, will vary. The lateral fields of view of video cameras mounted on aircraft 400 may provide some image overlap between cameras. This overlap may provide multiple simultaneous views of objects that may strike aircraft 400.

Figure 5:
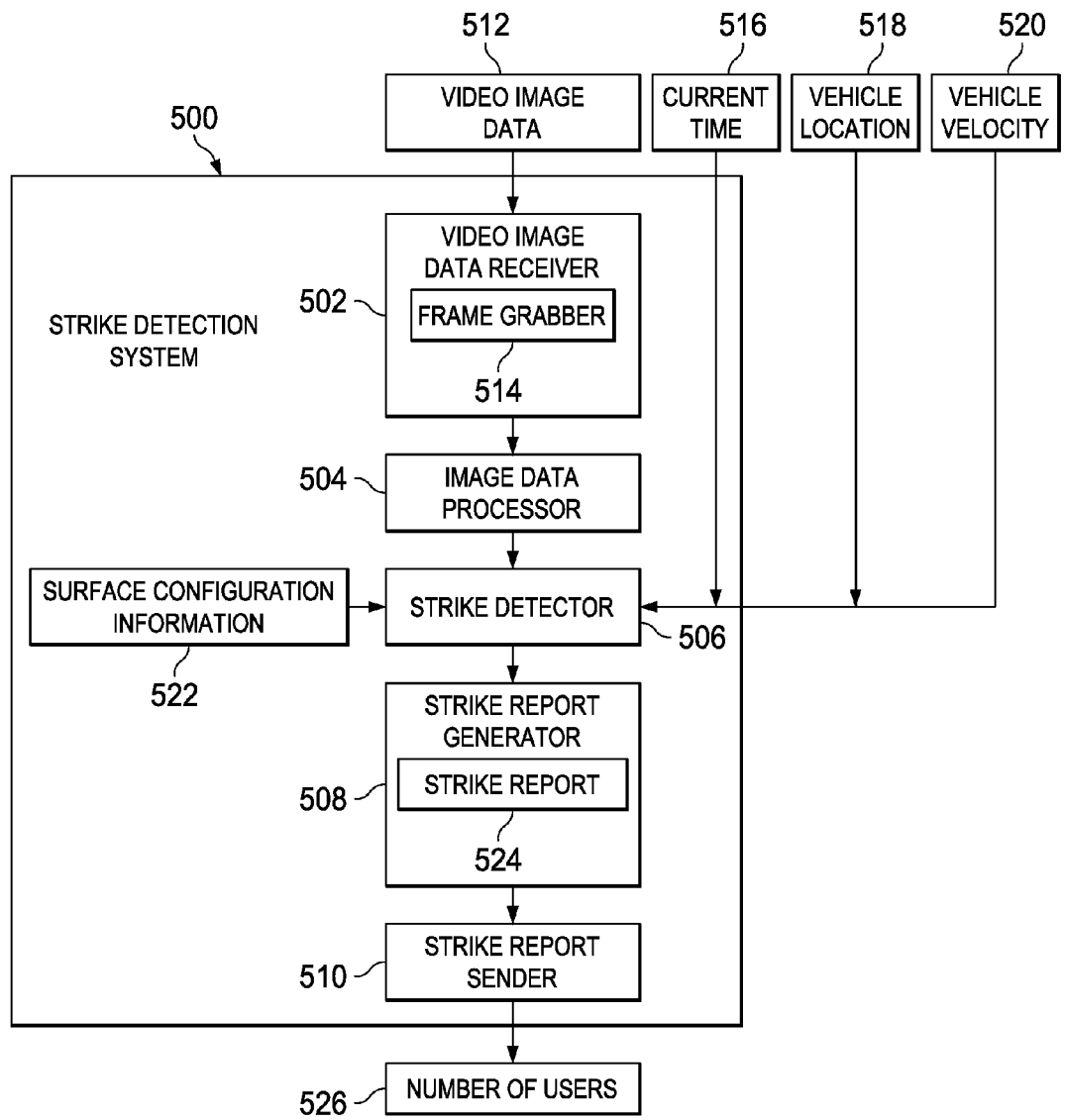
FIG. 5 is an illustration of a block diagram of a strike detection system in accordance with an illustrative embodiment.

Turning now to FIG. 5, an illustration of a block diagram of a strike detection system is depicted in accordance with an illustrative embodiment. In this example, strike detection system 500 is an example of one implementation of strike detection system 204 in FIG. 2. Strike detection system 500 may include video image data receiver 502, image data processor 504, strike detector 506, strike report generator 508, and strike report sender 510.

Video image data receiver 502 may be configured to receive video image data 512. Video image data receiver 502 may be configured to receive video image data 512 for video images from a camera system on an aircraft or other vehicle. For example, without limitation, video image data receiver 502 may include frame grabber 514 for obtaining video image data from the camera system.

Strike detection system 500 also may be configured to receive other information from various sources. For example, without limitation, strike detection system 500 may be configured to receive or obtain current time 516, vehicle location 518, vehicle velocity 520, surface configuration information 522, or other information that may be used by strike detection system 500. Vehicle location 518 may include information identifying the current location of the vehicle. Vehicle velocity 520 may include information identifying the current speed and direction of movement of the vehicle. Strike detection system 500 may be configured to receive current time 516, vehicle location 518, vehicle velocity 520, or other information or combinations of information from various devices or systems on the aircraft or other vehicle. Surface configuration information 522 may include information identifying a shape and size of a surface of the aircraft or other vehicle that may be struck by an object. Surface configuration information 522 may be stored, in whole or in part, as part of strike detection system 500 or in a storage device that is not part of strike detection system 500 but that may be accessible by strike detection system 500.

Image data processor 504 may be configured to process video image data 512 to identify an image of an object that may strike the vehicle in a number of video images and to identify the movement of the object with respect to the vehicle from the number of video images. For example, without limitation, image data processor 504 may be configured to identify the image of the object in a series of video images to track movement of the image of the object over time in the series of video images. The movement of the object with respect to the aircraft or other vehicle then may be determined from the movement of the image of the object in the series of video images. Image data processor 504 also may be configured to process video image data 512 to determine various other characteristics of the object. For example, without limitation, image data processor 504 may be configured to process video image data 512 to identify the size or other characteristics or combinations of characteristics of the object.

Strike detector 506 may be configured to use the identified movement and other characteristics of the object, as provided by image data processor 504, in combination with other information to determine whether the object has struck or is likely to strike the vehicle. For example, without limitation, strike detector 506 may be configured to determine that the object has struck or is likely to strike the vehicle by determining that the movement of the object with respect to the vehicle and the size of the object indicates that at least a portion of the object and at least a portion of the vehicle will be in the same place at the same time. Strike detector 506 may use surface configuration information 522 to determine whether the object will strike the vehicle and to identify a location on the surface of the vehicle that is struck or is likely to be struck by the object. Strike detector 506 also may be configured to identify other characteristics of a strike. For example, without limitation, strike detector 506 may be configured to identify whether a strike is likely to cause an inconsistency on the vehicle and the likely severity of any such inconsistency.

Strike report generator 508 may be configured to generate strike report 524. Strike report 524 may include information indicating that an object has struck or is likely to strike the vehicle. Strike report 524 also may include information identifying various characteristics of the object and of the strike as may be determined by image data processor 504 and strike detector 506. The format and content of strike report 524 may depend on number of users 526 to which strike report 524 may be sent and on how the information in strike report 524 may be used by number of users 526.

Strike report sender 510 may be configured to send strike report 524 to number of users 526. The implementation of strike report sender 510 for any particular application may depend on specific characteristics of number of users 526, such as how strike report 524 may be delivered to number of users 526 for use by number of users 526.

Any appropriate methods may be used by strike detection system 500 to process video image data 512 to identify an object that may strike the vehicle, to determine whether the object has struck the vehicle or is likely to strike the vehicle, and to determine various characteristics of the object and of the strike. For example, any appropriate method may be used by strike detection system 500 to distinguish images of objects that may strike the vehicle from the background in the video images provided to strike detection system 500. Any appropriate method may be used to track the images of such an object in multiple video images over time to identify movement of the object with respect to the vehicle. Any appropriate geometric calculations then may be used to determine whether the movement of the object with respect to the vehicle indicates that the object is likely to strike the vehicle and the location on the vehicle that is likely to be struck.

Figure 6:
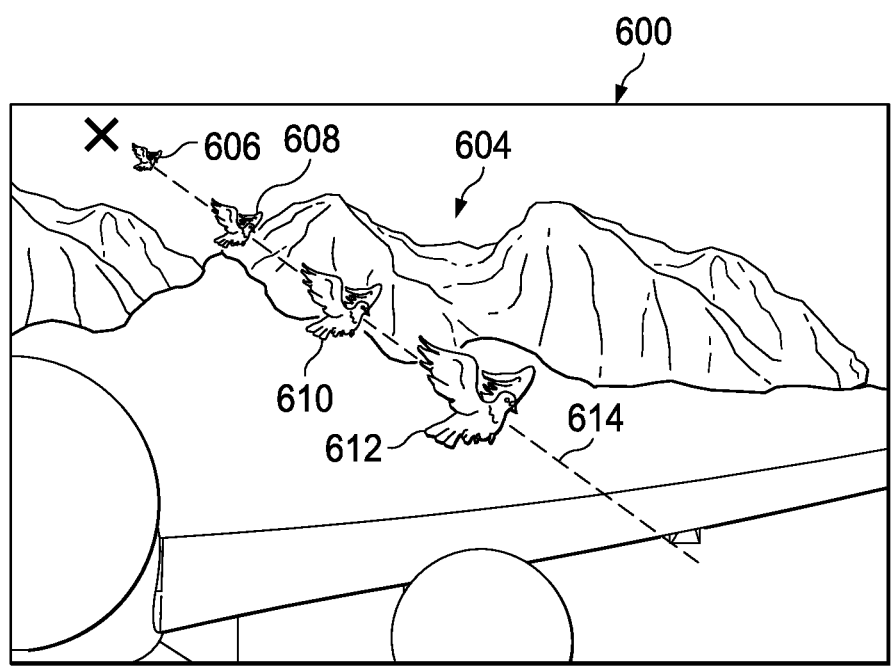
FIG. 6 is an illustration of images from a video camera on an aircraft in accordance with an illustrative embodiment.

Turning now to FIG. 6, an illustration of images from a video camera on an aircraft is depicted in accordance with an illustrative embodiment. In this example, images 600 are an example of video images 220 that may be provided by camera system 222 on aircraft 200 in FIG. 2.

In this example, images 600 may be provided from a video camera on the starboard side of an aircraft when the aircraft is in level cruise flight. Images 600 represent an overlaid series of images over time of a scene including background image 604 and images 606, 608, 610, and 612 of a bird. In this example, it is assumed that the aircraft is relatively far from the mountains appearing in background image 604. In this case, the movement of background image 604 between images in the series of images is negligible. The bird is much closer to the aircraft, so the image of the bird in images 600 changes from image 606 to image 608 to image 610 to image 612 over the series of images.

Movement of the bird with respect to the aircraft, represented by line 614, may be identified from the series of images 606, 608, 610, and 612 of the bird. The movement of the bird with respect to the aircraft may be used to determine whether the bird will strike the aircraft and the location on the aircraft at which the bird may strike the aircraft.

Images 606, 608, 610, and 612 of the bird also may be used to identify the size of the bird or other characteristics or combinations of characteristics of the bird. The size of the bird or other characteristics or combinations of characteristics of the bird also may be used to determine whether the bird will strike the aircraft, the location on the aircraft at which the bird may strike the aircraft, or other characteristics or combinations of characteristics of the strike.

Figure 7:
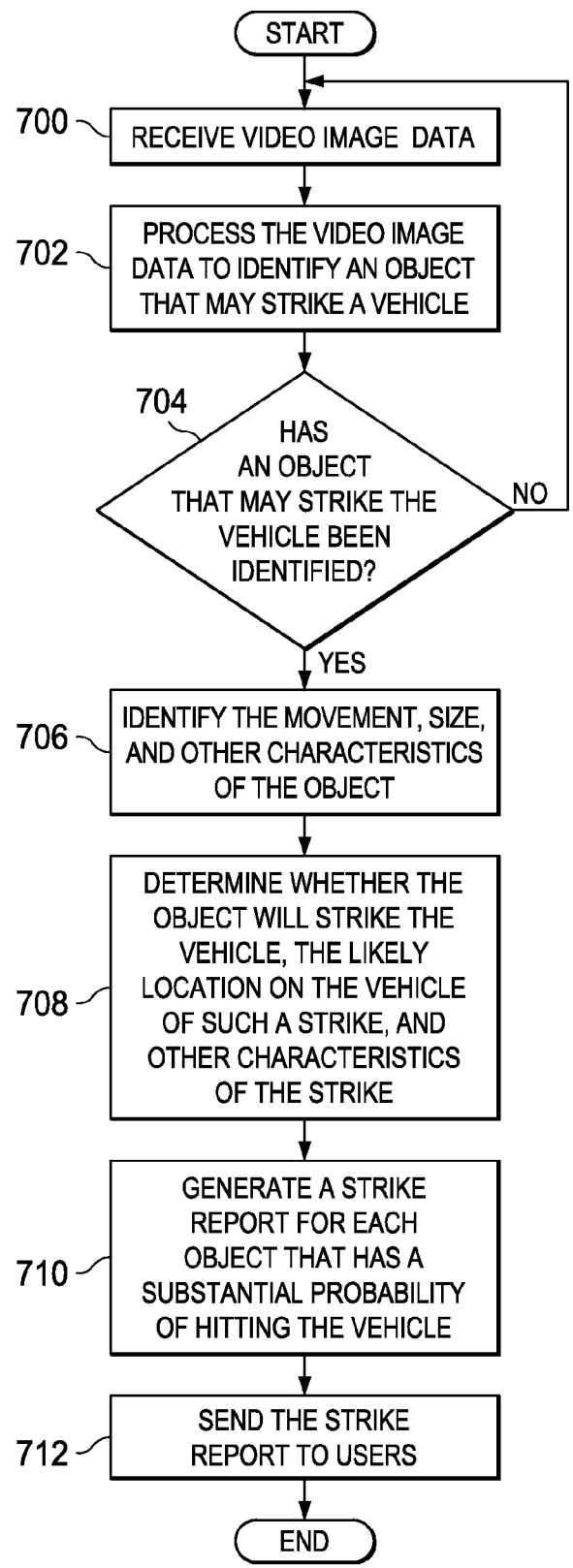
FIG. 7 is an illustration of a flowchart of a process for strike detection in accordance with an illustrative embodiment.

Turning now to FIG. 7, an illustration of a flowchart of a process for strike detection is depicted in accordance with an illustrative embodiment. In this example, the process of FIG. 7 may be implemented in strike detection system 204 in FIG. 2 or in strike detection system 500 in FIG. 5. The process of FIG. 7 may be repeated during all or part of the time that a vehicle is in operation to detect objects striking, or likely to strike, the vehicle and to report such strikes.

The process begins by receiving video image data (operation 700). For example, without limitation, operation 700 may include obtaining video image data for video images from a camera system mounted on a vehicle.

The video image data is processed to identify an object that may strike a vehicle (operation 702). For example, without limitation, operation 702 may include processing the video image data to identify an image of a bird or other object that may strike the vehicle in the video images. Operation 702 may include processing the video image data to distinguish images of the bird or other object that may strike the vehicle in the video images from images of the background in the video images. Any appropriate method for identifying an object that may strike the vehicle in the video images may be used.

For example, without limitation, for embodiments where the camera system used to provide the image data provides image data for color video images, a color difference between the image of the bird or other object that may strike the vehicle and the image of the background in the video images may be used to identify the image of the bird or other object in the video images. Color image processing may be well understood in the art and persons skilled in the art may take advantage of color information in video image data to identify an image of an object of interest in color video images.

In another example, without limitation, for embodiments where the camera system used to provide the video image data has sufficiently high resolution, standard machine vision techniques may be used to identify an image of a bird or other object that may strike the vehicle in a video image. In video images provided by such a camera, the image of the bird or other object that may strike the vehicle may cover several picture elements when the bird or other object is a relatively long distance from the vehicle. Standard machine vision techniques may work well when the object to be identified in an image covers several picture elements.

Such high resolution may come at a cost. A higher resolution camera may use a lens with a longer focal length and relatively large aperture. These characteristics of a higher resolution camera may make the camera relatively heavy. A relatively heavy camera may increase the cost of operating an aircraft. Therefore, use of a heavier higher resolution camera may not be desirable for many aircraft operators. As a result, many typical aircraft-mounted cameras may be relatively light and may have relatively low resolution.

For embodiments where the camera system used to provide the video image data has relatively lower resolution, the image of a bird or other object that may strike the vehicle may cover only a fraction of a picture element in the video images until the bird or other object is quite close to the vehicle. In this case, an appropriate method may be used to identify an image of a bird or other object that may strike the vehicle in the video images when the image of the bird or other object in the video images is smaller than one picture element.

As a bird or other object approaches an aircraft or other vehicle, the bird or other object may appear in front of points in the background scene that may have various radiance values. The radiance of the bird or other object, however, may be constant. It may be possible to identify the image of a bird or other object in the video images by identifying changes in the intensity of each picture element of the video images in which the image of the bird or other object appears.

Like any sensor, a camera may be subject to noise. In addition, the point in a background scene that is shown at each picture element position in the video images may change constantly as the aircraft moves, and different points in the background scene may have different radiance. The result is that the intensity contributed by the background scene at each picture element position in the video images may not be certain. The magnitude of this uncertainty may vary from picture element to picture element in the video images depending on several factors. Therefore, it may not be possible to use one picture element at a time to identify reliably the image of a bird or other object in the video images until the bird or other object is quite close to the vehicle.

For more reliable identification of a bird or other object in the video images, a statistical test may be applied to multiple picture element positions in multiple frames of the video images. The statistical test may test the null hypothesis that a set of picture elements occupied by a putative image of a bird or other object that may strike the vehicle have the same intensities as their background scene points. This null hypothesis can only be true if the putative image of the bird has the same radiance as each of the background points of the picture elements or if the putative image of the bird is not actually present. If the null hypothesis is rejected with enough confidence, then the alternative hypothesis, that the set of picture elements has a different intensity than their background scene points, must be accepted. In this case, the putative image of the bird in the image frame may be assumed to exist.

It may be determined whether or not an object that may strike the vehicle has been identified by the processing of the video image data (operation 704). If an image of an object that may strike the vehicle is not identified in the video images, the process may return to operation 700. Operations 700 and 702 may be repeated to continue to receive video image data and process the video image data until it is determined at operation 704 that an image of an object that may strike the vehicle has been identified in the video images.

If it is determined at operation 704 that an image of an object that may strike the vehicle is identified in the video images, the movement, size, and other characteristics of the object may be identified (operation 706). Operation 706 may include processing the video image data to identify the movement, size, and other characteristics of the object. Any appropriate method may be used to identify the movement, size, and other characteristics of the object. For example, without limitation, the movement of the object with respect to the vehicle may be identified by determining the apparent direction of travel of the object from the changing positions of the images of the object as identified in a series of video images over time.

In embodiments where the video image data is for video images from multiple cameras, images of an object that may strike the vehicle may be identified in the video images provided by two or more cameras. In this case, trigonometry may be used to more precisely estimate the movement of the object with respect to the vehicle. If the fields of view of the multiple cameras overlap, and the object passes through the region of overlap, then computing the movement of the object with respect to the vehicle is a matter of simple geometry. For cases where the object passes through the fields of view of multiple cameras, but does not pass through the region of overlap, other methods may be used.

In cases where an object is so large and so close to a vehicle that the images of the object fills several picture elements in the video images, the size of the object may be identified using standard machine vision technology. Identifying the size of an object that may strike the vehicle may be more difficult when the images of the object in the video images are smaller than a picture element. For example, this may be the case when a camera with relatively low resolution is used to obtain the video images or when the distance of the object from the camera is relatively large.

When an image of the object appears within a picture element, the intensity of that picture element changes. If the object is brighter than the background in that picture element, the picture element becomes brighter. The amount of brightening is proportional to both the area covered by the object and to the difference in brightness between the object and the background. Likewise, if the object is darker than the background, the picture element becomes darker. The amount of darkening is also proportional to the area covered by the object and to the difference in brightness.

The change in the intensity of a picture element when an image of an object passes through it may be measured. If the brightness of the object can be identified, then the area covered by the object can be determined. The size of the object may be estimated from the determined area covered by the object.

One way to identify the brightness of an object that may strike the vehicle is to observe the passage of the image of the object through many picture elements in the video images and note any picture element whose brightness does not change when the image of the object passes through that picture element. The object may be presumed to have the same brightness as the background in that picture element.

If the image of the object passes through two picture elements with different background intensities, which will occur in almost any realistic case, the picture element with a background that is closer in intensity to the object will have a smaller intensity change when the image of the object passes through it. This relative change in intensity of the picture elements may be exploited by using simultaneous equations to find the brightness of the object.

Whether the object will strike the vehicle, the likely location on the vehicle of such a strike, and other characteristics of the strike then may be determined (operation 708). Operation 708 may include determining the probability that the object will strike the vehicle and the location of the strike using the estimated movement of the object as identified in the previous operation. Operation 708 also may include using the estimated size or other characteristics of the object as identified in the previous operation to determining the probability and location of the strike. Any appropriate method may be used to determine whether the object will strike the vehicle, the likely location on the vehicle of such a strike, and other characteristics of the strike.

For example, without limitation, operation 708 may include determining an intersection of the line of movement of the object with respect to an aircraft with a stored representation of the surface of the aircraft. The representation of the surface of the aircraft may be provided as surface configuration information that is loaded on the aircraft before a flight. The representation of the surface of the aircraft may be changed during flight to reflect changes to the aircraft surface during flight. For example, without limitation, the representation of the surface of the aircraft may be changed during flight based on an estimated weight of the aircraft, which decreases as fuel is consumed, on wing bending as measured by a camera on the aircraft, or based on other factors or combinations of factors. If the determined intersection of the line of movement of the object with the representation of the surface of the aircraft is nil, no strike occurs. If the determined intersection of the line of movement of the object with the representation of the surface of the aircraft is not nil, then a strike occurs. In this case, the location of the intersection of the line of movement of the object with the representation of the surface of the aircraft may also indicate the location of the strike on the vehicle.

Due to measurement imprecision, for example, the actual movement of an object that may strike a vehicle is unlikely to lie exactly along the line of movement of the object as identified in operation 706. Rather, it may lie somewhere near that line. This means that an object that may be predicted to miss a vehicle by a modest distance actually may have a non-zero chance to strike the vehicle.

This issue may be addressed by quantifying the imprecision. Known error-accumulation techniques may be used to estimate the error of the identified movement of the object based on characteristics of the camera, its mounting, aircraft structural flexing, uncertainties in the timing reference between cameras, and other factors or combinations of factors. These error estimates, plus known error-propagation methods, may be used to calculate a probability density function for the movement of the object. For applications where computational power is costly and high precision is not needed, the probability density function may be estimated as, for example, an elliptical probability distribution using known methods. The probability density function may be integrated over the vehicle surface to estimate the probability that the object will strike the vehicle.

A strike report may be generated for each object that has a substantial probability of hitting the vehicle (operation 710). The format and contents of the strike report may depend on the manner in which the strike report is to be used. For example, without limitation, the strike report may include information identifying that a strike has occurred, or is likely to occur, and information identifying various characteristics of the strike. For example, without limitation, the strike report may include information identifying the location of the strike on the vehicle, the size of the object striking the vehicle, or other characteristics or combinations of characteristics of the strike.

The strike report may be sent to users (operation 712), with the process terminating thereafter. For example, without limitation, users of the strike report may include a human operator on the vehicle, a remote human operator not on the vehicle, an automated control system for the vehicle, a maintenance entity for the vehicle, or any other user that may make use of the information in the strike report.

One or more of the illustrative embodiments provides a capability to detect and track a bird near a manned or unmanned aircraft. A system and method in accordance with an illustrative embodiment may be used to determine whether a bird has struck, or will strike, the aircraft. If a strike is identified, characteristics of the strike, such as the size of the bird, the location of impact on the aircraft, the impact speed, or other characteristics of the strike may be reported to the aircraft operator. With this information, the aircraft operator may make better-informed decisions about how to respond to the bird strike, such as whether to divert to an alternate landing site or what spare parts to pre-position for repair. In some embodiments, a bird strike may be predicted and reported to the flight management system in time to take evasive action to avoid the impact or to minimize undesired effects of the impact.

Figure 8:
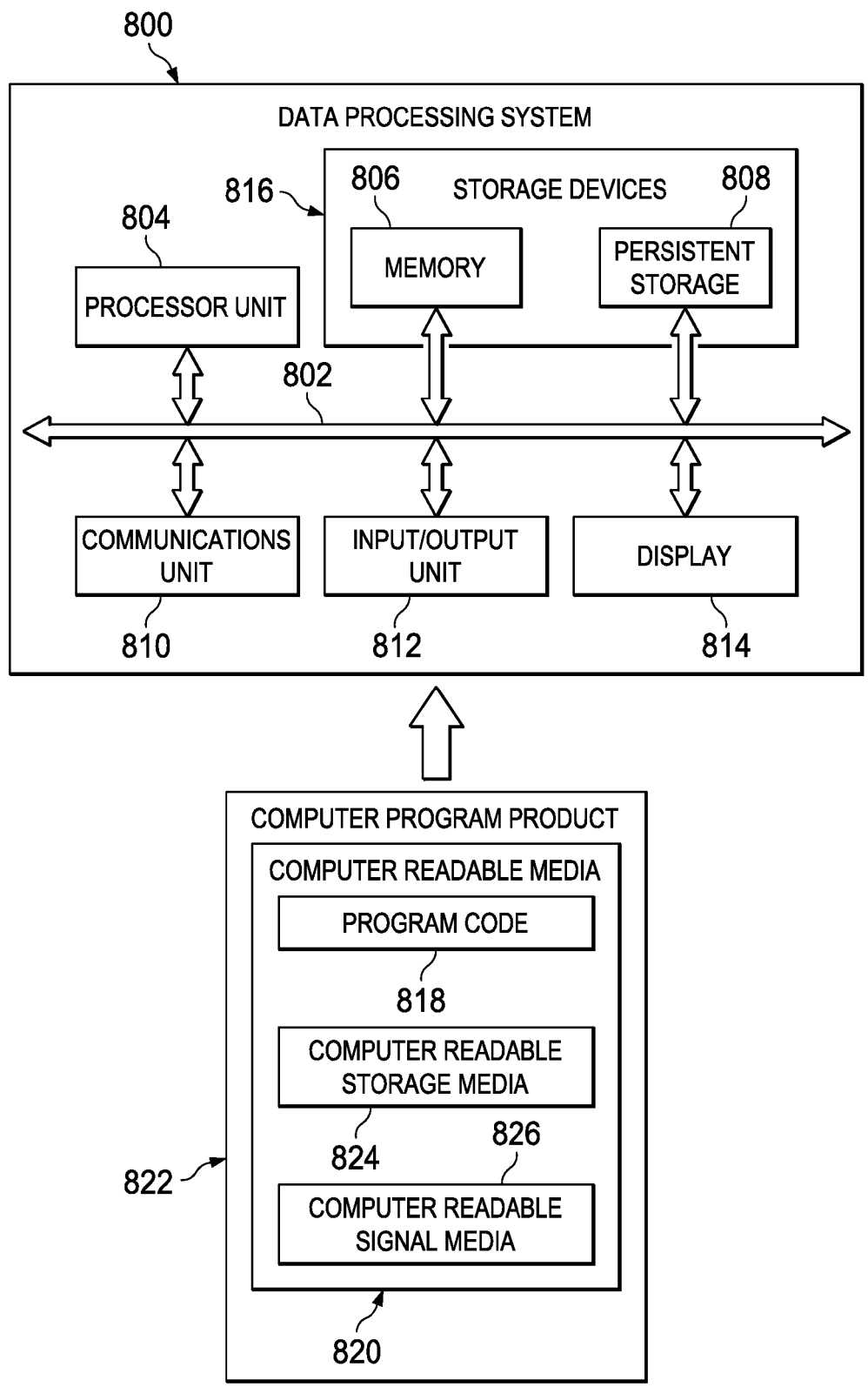
FIG. 8 is an illustration of a block diagram of a data processing system in accordance with an illustrative embodiment.

Turning now to FIG. 8, an illustration of a block diagram of a data processing system is depicted in accordance with an illustrative embodiment. In this example, data processing system 800 is an example of one implementation of a data processing system for implementing strike detection system 204 in FIG. 2 or strike detection system 500 in FIG. 5.

In this illustrative example, data processing system 800 includes communications fabric 802. Communications fabric 802 provides communications between processor unit 804, memory 806, persistent storage 808, communications unit 810, input/output (I/O) unit 812, and display 814. Memory 806, persistent storage 808, communications unit 810, input/output (I/O) unit 812, and display 814 are examples of resources accessible by processor unit 804 via communications fabric 802.

Processor unit 804 serves to run instructions for software that may be loaded into memory 806. Processor unit 804 may be a number of processors, a multi-processor core, or some other type of processor, depending on the particular implementation. Further, processor unit 804 may be implemented using a number of heterogeneous processor systems in which a main processor is present with secondary processors on a single chip. As another illustrative example, processor unit 804 may be a symmetric multi-processor system containing multiple processors of the same type.

Memory 806 and persistent storage 808 are examples of storage devices 816. A storage device is any piece of hardware that is capable of storing information, such as, for example, without limitation, data, program code in functional form, and other suitable information either on a temporary basis or a permanent basis. Storage devices 816 also may be referred to as computer readable storage devices in these examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these examples, provides for communications with other data processing systems or devices. In these examples, communications unit 810 is a network interface card. Communications unit 810 may provide communications through the use of either or both physical and wireless communications links.

Input/output (I/O) unit 812 allows for input and output of data with other devices that may be connected to data processing system 800. For example, input/output (I/O) unit 812 may provide a connection for user input through a keyboard, a mouse, and/or some other suitable input device. Further, input/output (I/O) unit 812 may send output to a printer. Display 814 provides a mechanism to display information to a user.

Instructions for the operating system, applications, and/or programs may be located in storage devices 816, which are in communication with processor unit 804 through communications fabric 802. In these illustrative examples, the instructions are in a functional form on persistent storage 808. These instructions may be loaded into memory 806 for execution by processor unit 804. The processes of the different embodiments may be performed by processor unit 804 using computer-implemented instructions, which may be located in a memory, such as memory 806.

These instructions are referred to as program instructions, program code, computer usable program code, or computer readable program code that may be read and executed by a processor in processor unit 804. The program code in the different embodiments may be embodied on different physical or computer readable storage media, such as memory 806 or persistent storage 808.

Program code 818 is located in a functional form on computer readable media 820 that is selectively removable and may be loaded onto or transferred to data processing system 800 for execution by processor unit 804. Program code 818 and computer readable media 820 form computer program product 822 in these examples. In one example, computer readable media 820 may be computer readable storage media 824 or computer readable signal media 826.

Computer readable storage media 824 may include, for example, an optical or magnetic disk that is inserted or placed into a drive or other device that is part of persistent storage 808 for transfer onto a storage device, such as a hard drive, that is part of persistent storage 808. Computer readable storage media 824 also may take the form of a persistent storage, such as a hard drive, a thumb drive, or a flash memory, that is connected to data processing system 800. In some instances, computer readable storage media 824 may not be removable from data processing system 800.

In these examples, computer readable storage media 824 is a physical or tangible storage device used to store program code 818 rather than a medium that propagates or transmits program code 818. Computer readable storage media 824 is also referred to as a computer readable tangible storage device or a computer readable physical storage device. In other words, computer readable storage media 824 is a media that can be touched by a person.

Alternatively, program code 818 may be transferred to data processing system 800 using computer readable signal media 826. Computer readable signal media 826 may be, for example, a propagated data signal containing program code 818. For example, computer readable signal media 826 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 818 may be downloaded over a network to persistent storage 808 from another device or data processing system through computer readable signal media 826 for use within data processing system 800. For instance, program code stored in a computer readable storage medium in a server data processing system may be downloaded over a network from the server to data processing system 800. The data processing system providing program code 818 may be a server computer, a client computer, or some other device capable of storing and transmitting program code 818.

The different components illustrated for data processing system 800 are not meant to provide architectural limitations to the manner in which different embodiments may be implemented. The different illustrative embodiments may be implemented in a data processing system including components in addition to and/or in place of those illustrated for data processing system 800. Other components shown in FIG. 8 can be varied from the illustrative examples shown. The different embodiments may be implemented using any hardware device or system capable of running program code. As one example, data processing system 800 may include organic components integrated with inorganic components and/or may be comprised entirely of organic components excluding a human being. For example, a storage device may be comprised of an organic semiconductor.

In another illustrative example, processor unit 804 may take the form of a hardware unit that has circuits that are manufactured or configured for a particular use. This type of hardware may perform operations without needing program code to be loaded into a memory from a storage device to be configured to perform the operations.

For example, when processor unit 804 takes the form of a hardware unit, processor unit 804 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 818 may be omitted, because the processes for the different embodiments are implemented in a hardware unit.

In still another illustrative example, processor unit 804 may be implemented using a combination of processors found in computers and hardware units. Processor unit 804 may have a number of hardware units and a number of processors that are configured to run program code 818. With this depicted example, some of the processes may be implemented in the number of hardware units, while other processes may be implemented in the number of processors.

In another example, a bus system may be used to implement communications fabric 802 and may be comprised of one or more buses, such as a system bus or an input/output bus. Of course, the bus system may be implemented using any suitable type of architecture that provides for a transfer of data between different components or devices attached to the bus system.

Additionally, communications unit 810 may include a number of devices that transmit data, receive data, or both transmit and receive data. Communications unit 810 may be, for example, a modem or a network adapter, two network adapters, or some combination thereof. Further, a memory may be, for example, memory 806, or a cache, such as that found in an interface and memory controller hub that may be present in communications fabric 802.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description and is not intended to be exhaustive or to limit the embodiments in the form disclosed. Many modifications and variations will be apparent to those of ordinary skill in the art. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A process for determining a probability and a severity of an inconsistency caused by an object striking a vehicle, comprising a strike detection system:
   identifying images of the object, which cover only a fraction of a picture element in video images, from a video camera on the vehicle;
   identifying a movement of the object with respect to the vehicle from the images of the object in the video images;
   determining, based upon analysis of the picture element, whether the movement of the object with respect to the vehicle indicates the probability that the object will strike the vehicle; and
   generating a strike report comprising information indicating:
      a location of the vehicle that the object will strike the vehicle; and
      based upon a characteristic, determined from the video images, of the object, the probability and the severity of the inconsistency caused by the object striking the vehicle.

2. The process of claim 1, wherein determining whether the movement of the object with respect to the vehicle indicates that the object will strike the vehicle comprises:

comparing the movement of the object to surface configuration information for the vehicle, the surface configuration of the vehicle comprising a bending of the surface of the vehicle, prior to a strike, such that the bending of the surface of the vehicle being determined by a camera on the vehicle.

3. The process of claim 1 further comprising:

identifying a size of the object from the images of the object in the video images, via determining a proportionality in the picture element of a brightness of an area of the picture element covered by the object, relative to a brightness of a background in the picture element; and including information indicating the size of the object in the strike report.

4. The process of claim 1 further comprising:

using the strike report, determining whether to allow the vehicle to continue to a destination.

5. The process of claim 1 further comprising:

sending the strike report to at least one of a display on the vehicle, data storage, an operator of the vehicle not on the vehicle, and a maintenance entity for the vehicle.

6. The process of claim 1, wherein the vehicle is an aircraft and the object is a bird, and the strike report comprises and evaluation of whether the severity of the inconsistency compromises a stealth characteristic of the aircraft.

7. The process of claim 1, wherein the vehicle is an aircraft and further comprising:

the location of the strike being one that cannot be visually confirmed by an operator of the aircraft during flight; and sending the strike report to a flight management system for the aircraft.

8. An apparatus comprising:

a video image data receiver configured to receive video image data for video images from a video camera on a vehicle, such that, in operation, the video image data receiver receives the video image data for video images from the video camera on the vehicle;

an image data processor configured to process the video image data to identify:

images of an object, capable of maneuvering in three dimensions, and which covers only a fraction of a picture element in the video images; and a movement of the object with respect to the vehicle, from the images of the object in the video images, such that, in operation, the image data processor processes the video image data and identifies:

images of the object, capable of maneuvering in three dimensions, and which covers only a fraction of a picture element in the video images, and the movement of the object with respect to the vehicle, from the images of the object in the video images;

a strike detector configured to determine:

a probability and a location on the vehicle that the object will strike the vehicle: and a probability, based upon a characteristic of the object, determined from the video image data, that a strike will cause an inconsistency in the vehicle, and a severity of the inconsistency, such that, in operation, the strike detector determines:

the probability and the location on the vehicle that the object will strike the vehicle; and the probability, based upon the characteristic of the object, determined from the video image data, that the strike will cause the inconsistency in the vehicle, and the severity of the inconsistency and a strike report generator configured to generate a strike report, comprising information indicating that the object will strike the vehicle, in response to a determination that the object will strike the vehicle, such that, in operation, the strike report generator generates the strike report, comprising information indicating that the object will strike the vehicle, in response to the determination that the object will strike the vehicle.

9. The apparatus of claim 8, wherein the strike detector is configured to compare the movement of the object to surface configuration information for the vehicle to determine whether the movement of the object with respect to the vehicle indicates that the object will strike the vehicle, such that, in operation, the strike detector compares the movement of the object to surface configuration information for the vehicle to determine whether the movement of the object with respect to the vehicle indicates that the object will strike the vehicle.

10. The apparatus of claim 8, wherein:

the image data processor is configured to determine a size of the object from the images of the object in the video images, such that, in operation, the image data processor determines the size of the object from the images of the object in the video images; and the strike report generator is configured to include information that indicates the size of the object in the strike report, such that, in operation, the strike report comprises information from the strike report generator that indicates the size of the object.

11. The apparatus of claim 8, wherein:

the strike detector is configured to determine the location on the vehicle where the object strikes the vehicle, based upon a bending of a surface of the vehicle determined by a camera on the vehicle, such that, in operation, the strike detector determines the location on the vehicle where the object strikes the vehicle, based upon a bending of a surface of the vehicle determined by a camera on the vehicle; and the strike report generator is configured to include information that indicates the location on the vehicle where the object strikes the vehicle in the strike report, based upon a bending of a surface of the vehicle determined by a camera on the vehicle, such that, in operation, the strike report comprises information from the strike report generator that indicates the location on the vehicle where the object strikes the vehicle, based upon a bending of a surface of the vehicle determined by a camera on the vehicle.

12. The apparatus of claim 8 further comprising:

a strike report sender configured to send the strike report to at least one of: a display on the vehicle, data storage on the vehicle, an operator of the vehicle not on the vehicle, and a maintenance entity for the vehicle, such that, in operation, the strike report sender sends the strike report to at least one of: the display on the vehicle, data storage on the vehicle, the operator of the vehicle not on the vehicle, and the maintenance entity for the vehicle.

13. The apparatus of claim 8, wherein the vehicle is an unmanned aircraft and the object is a bird.

14. The apparatus of claim 13 further comprising:

a strike report sender configured to send the strike report to a flight management system on the aircraft, such that, in operation, the strike report sender sends the strike report to the flight management system on the aircraft.

15. An apparatus comprising:
a camera system, on an aircraft, configured to provide video images, such that, in operation, the camera system provides video images; and
a strike detection system, on the aircraft, configured to:
receive video image data for the video images from the camera system;
process the video image data to identify:
images of a bird, which cover only a fraction of a picture element in the video image data; and
a movement of the bird with respect to the aircraft from the images of the bird in the video images,
determine whether the movement of the bird with respect to the aircraft indicates a probability that the bird will strike the aircraft, and
generate a strike report comprising information indicating:
a location on the aircraft that the bird will strike the aircraft; and
based upon a characteristic of the bird, determined from the camera system, a probability and a severity, of an inconsistency caused by the bird striking the aircraft, such that, in operation, the strike detection system:
receives the video image data for the video images from the camera system;
processes the video image data to identify:
images of the bird, which cover only a fraction of a picture element in the video image data; and
a movement of the bird with respect to the aircraft from the images of the bird in the video images,
determines whether the movement of the bird with respect to the aircraft indicates the probability that the object will strike the aircraft, and
generates the strike report comprising information indicating:
the location on the aircraft that the bird will strike the aircraft; and
based upon the characteristic of the bird, determined from the camera system, the probability and the severity, of the inconsistency caused by the bird striking the aircraft.

16. The apparatus of claim 15, wherein:
the strike detection system is configured to compare the movement of the bird to surface configuration information for the aircraft, comprising a camera determining a bending of a surface of the aircraft, to determine whether the movement of the bird with respect to the aircraft indicates that the bird will strike the aircraft, such that, in operation, the strike detection system compares the movement of the bird to surface configuration information for the aircraft, comprising the camera determining a bending of a surface of the aircraft, and determines whether the movement of the bird with respect to the aircraft indicates that the bird will strike the aircraft.

17. The apparatus of claim 16, wherein:
the surface configuration information is changed during flight of the aircraft.

18. The apparatus of claim 15, wherein the strike detection system is further configured to:
determine a size, and a color, of the bird from the images of the bird in the video images; and
include information indicating the size of the bird in the strike report, such that, in operation, the strike detection system:
determines the size and the color, of the bird from the images of the bird in the video images; and
includes information indicating the size of the bird in the strike report.

19. The apparatus of claim 15, wherein the strike detection system is further configured to identify whether a stealth characteristic of the aircraft is degraded by the location on the aircraft where the bird strikes the aircraft, such that, in operation, the strike detection system identifies whether the stealth characteristic of the aircraft is degraded by the location on the aircraft where the bird strikes the aircraft.

20. The apparatus of claim 15, wherein the strike detection system is further configured to:
send the strike report to at least one of an aircraft display on the aircraft, a data storage, a communication system on the aircraft, and a flight management system for the aircraft, such that, in operation, the strike detection system sends the strike report to at least one of: the aircraft display on the aircraft, the data storage, the communication system on the aircraft, and the flight management system for the aircraft.

* * * * *